United States Patent
Johansson et al.

(10) Patent No.: US 10,785,261 B2
(45) Date of Patent: *Sep. 22, 2020

(54) TECHNIQUES FOR SECURE SESSION REESTABLISHMENT

(71) Applicant: Amazon Technologies, Inc., Seattle, WA (US)

(72) Inventors: Jesper Mikael Johansson, Redmond, WA (US); Darren Ernest Canavor, Redmond, WA (US); Jon Arron McClintock, Seattle, WA (US); Gregory Branchek Roth, Seattle, WA (US); Gregory Alan Rubin, Seattle, WA (US); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,471

(22) Filed: Mar. 9, 2018

(65) Prior Publication Data
US 2018/0198823 A1 Jul. 12, 2018

Related U.S. Application Data

(63) Continuation of application No. 14/576,146, filed on Dec. 18, 2014, now Pat. No. 9,930,067.

(51) Int. Cl.
*H04L 29/06* (2006.01)

(52) U.S. Cl.
CPC ........ *H04L 63/166* (2013.01); *H04L 63/0281* (2013.01); *H04L 63/0428* (2013.01); *H04L 63/0478* (2013.01); *H04L 63/06* (2013.01); *H04L 63/123* (2013.01); *H04L 2463/061* (2013.01)

(58) Field of Classification Search
CPC .............. H04L 63/0281; H04L 63/166; H04L 2463/061
See application file for complete search history.

(56) References Cited

U.S. PATENT DOCUMENTS

| 7,546,460 B2 * | 6/2009 | Maes ................. H04L 63/0428 713/150 |
| 8,346,949 B2 | 1/2013 | Vaarala et al. |
| 8,782,414 B2 | 7/2014 | Patiejunas |

(Continued)

OTHER PUBLICATIONS

Gutmann, "Encrypt-then-MAC for Transport Layer Security (TLS) and Datagram Transport Layer Security (DTLS)," Request for Comments: 7366, Standards Track, Sep. 2014, 7 pages.

(Continued)

*Primary Examiner* — Madhuri R Herzog
(74) *Attorney, Agent, or Firm* — Davis Wright Tremaine LLP

(57) ABSTRACT

A client establishes a network session with a server. The network session is used to establish an encrypted communications session. The client establishes another network session with another server, such as after terminating the first network session. The client resumes the encrypted communications session over the network session with the other server. The other server is configured to receive encrypted communications from the client and forward them to the appropriate server.

20 Claims, 8 Drawing Sheets

(56) References Cited

U.S. PATENT DOCUMENTS

| | | | |
|---|---|---|---|
| 2007/0192494 A1* | 8/2007 | Yamakawa | H04L 67/2804 709/227 |
| 2008/0130900 A1* | 6/2008 | Hsieh | H04L 63/145 380/278 |
| 2008/0162929 A1* | 7/2008 | Ishikawa | H04L 9/0833 713/160 |
| 2009/0222888 A1 | 9/2009 | Malpani et al. | |
| 2009/0307495 A1* | 12/2009 | Matsuo | H04L 9/002 713/171 |
| 2010/0040234 A1 | 2/2010 | Alrabady et al. | |
| 2011/0088089 A1 | 4/2011 | MacDonald | |
| 2011/0154019 A1* | 6/2011 | Wang | H04L 63/0281 713/153 |
| 2011/0296186 A1* | 12/2011 | Wong | H04L 63/0272 713/171 |
| 2011/0320359 A1 | 12/2011 | Li et al. | |

OTHER PUBLICATIONS

Merkle et al., "Elliptic Curve Cryptography (ECC) Brainpool Curves for Transport Layer Security (TLS)," Request for Comments: 7027, Informational, Oct. 2013, 11 pages.

McGrew et al., "AES-CCM Cipher Suites for Transport Layer Security (TLS)," Request for Comments: 6655, Standards Track, Jul. 2012, 8 pages.

Salter et al., "Suite B Profile for Transport Layer Security (TLS)," Request for Comments: 6460, Informational, Jan. 2012, 15 pages.

Kanno et al., "Addition of the Camellia Cipher Suites to Transport Layer Security (TLS)," Request for Comments: 6367, Informational, Sep. 2011, 9 pages.

Rescorla et al., "Datagram Transport Layer Security Version 1.2," Request for Comments: 6347, Standards Track, Jan. 2012, 33 pages.

Kim et al., "Addition of the ARIA Cipher Suites to Transport Layer Security (TLS)," Request for Comments: 6209, Informational, Apr. 2011, 10 pages.

Turner et al., "Prohibiting Secure Sockets Layer (SSL) Version 2.0," Request for Comments: 6176, Standards Track, Mar. 2011, 4 pages.

Mavrogiannopoulos et al., "Using OpenPGP Keys for Transport Layer Security (TLS) Authentication," Request for Comments: 6091, Informational, Feb. 2011, 9 pages.

Eastlake, "Transport Layer Security (TLS) Extensions: Extension Definitions," Request for Comments: 6066, Standards Track, Jan. 2011, 25 pages.

Tuexen et al., "Datagram Transport Layer Security (DTLS) for Stream Control Transmission Protocol (SCTP)," Request for Comments: 6083, Standards Track, Jan. 2011, 10 pages.

Kato et al., "Camellia Cipher Suites for TLS," Request for Comments: 5932, Standards Track, Jun. 2010, 7 pages.

Brown et al., "Transport Layer Security (TLS) Authorization Extensions," Request for Comments: 5878, Experimental, May 2010, 19 pages.

McGrew et al., "Datagram Transport Layer Security (DTLS) Extension to Establish Keys for the Secure Real-time Transport Protocol (SRTP)," Request for Comments: 5764, Standards Track, May 2010, 27 pages.

Rescorla et al., "Transport Layer Security (TLS) Renegotiation Indication Extension," Request for Comments: 5746, Standards Track, Feb. 2010, 16 pages.

Rescorla, "TLS Elliptic Curve Cipher Suites with SHA-256/384 and AES Galois Counter Mode (GCM)," Request for Comments: 5289, Informational, Aug. 2008, 7 pages.

Salowey, "AES Galois Counter Mode (GCM) Cipher Suites for TLS," Request for Comments: 5288, Standards Track, Aug. 2008, 9 pages.

Dierks et al., "The Transport Layer Security (TLS) Protocol Version 1.2," Request for Comments: 5246, Standards Track, Aug. 2008, 98 pages.

Phelan, "Datagram Transport Layer Security (DTLS) over the Datagram Congestion Control Protocol (DCCP)," Request for Comments: 5238, Standards Track, May 2008, 11 pages.

Mavrogiannopoulos, "Using OpenPGP Keys for Transport Layer Security (TLS) Authentication," Request for Comments: 5081, Experimental, Nov. 2007, 9 pages.

Salowey et al., "Transport Layer Security (TLS) Session Resumption without Server-Side State," Request for Comments: 5077, Standards Track, Jan. 2008, 21 pages.

Taylor et al., "Using the Secure Remote Password (SRP) Protocol for TLS Authentication," Request for Comments: 5054, Informational, Nov. 2007, 25 pages.

Blumenthal et al., "Pre-Shared Key (PSK) Ciphersuites with NULL Encryption for Transport Layer Security (TLS)," Request for Comments: 4785, Standards Track, Jan. 2007, 6 pages.

Santesson et al., "TLS User Mapping Extension," Request for Comments: 4681, Standards Track, Oct. 2006, 11 pages.

Santesson, "TLS Handshake Message for Supplemental Data," Request for Comments: 4680, Standards Track, Sep. 2006, 10 pages.

Blake-Wilson et al., "Elliptic Curve Cryptography (ECC) Cipher Suites for Transport Layer Security (TLS)," Request for Comments: 4492, Informational, May 2006, 36 pages.

Blake-Wilson et al., "Transport Layer Security (TLS) Extensions," Request for Comments: 4366, Standards Track, Apr. 2006, 29 pages.

Rescorla et al., "Datagram Transport Layer Security," Request for Comments: 4347, Standards Track, Apr. 2006, 26 pages.

Eronen et al., "Pre-Shared Key Ciphersuites for Transport Layer Security (TLS)," Request for Comments: 4279, Standards Track, Dec. 2005, 16 pages.

Ford-Hutchinson, "Securing FTP with TLS," Request for Comments: 4217, Standards Track, Oct. 2005, 29 pages.

Lee et al., "Addition of SEED Cipher Suites to Transport Layer Security (TLS)," Request for Comments: 4162, Standards Track, Aug. 2005, 7 pages.

Moriai et al., "Addition of Camellia Cipher Suites to Transport Layer Security (TLS)," Request for Comments: 4132, Standards Track, Jul. 2005, 8 pages.

Friend, "Transport Layer Security (TLS) Protocol Compression Using Lempel-Ziv-Stac (LZS)," Request for Comments: 3943, Informational, Nov. 2004, 13 pages.

Hollenbeck, "Transport Layer Security Protocol Compression Methods," Request for Comments: 3749, Standards Track, May 2004, 8 pages.

Blake-Wilson et al., "Transport Layer Security (TLS) Extensions," Request for Comments: 3546, Standards Track, Jun. 2003, 28 pages.

Chown, "Advanced Encryption Standard (AES) Ciphersuites for Transport Layer Security (TLS)," Request for Comments: 3268, Standards Track, Jun. 2002, 8 pages.

Hoffman, "SMTP Service Extension for Secure SMTP over Transport Layer Security," Request for Comments: 3207, Standards Track, Feb. 2002, 9 pages.

Dierks et al., "The TLS Protocol Version 1.0," Request for Comments: 2246, Standards Track, Jan. 1999, 75 pages.

Newman, "Using TLS with IMAP, POP3 and ACAP," Request for Comments: 2595, Standards Track, Jun. 1999, 16 pages.

Medvinsky et al., "Addition of Kerberos Cipher Suites to Transport Layer Security (TLS)," Request for Comments: 2712, Standards Track, Oct. 1999, 7 pages.

Khare et al., "Upgrading to TLS Within HTTP/1.1," Request for Comments: 2817, Standards Track, May 2000, 13 pages.

Rescorla, "HTTP Over TLS," Request for Comments: 2818, Informational, May 2000, 8 pages.

Allman, et al., "TCP Congestion Control," Network Working Group, Request for Comments: 2581, Apr. 1999, 15 pages.

Allman, et al., "TCP Congestion Control," Network Working Group, Request for Comments: 5681, Sep. 2009, 19 pages.

Braden, "Requirements for Internet Hosts—Communication Layers," Network Working Group, Request for Comments: 1122, Oct. 1989, 117 pages.

Cerf et al., "Specification of Internet Transmission Control Program," Network Working Group, Request for Comments: 675, Dec. 1974, 71 pages.

(56) References Cited

OTHER PUBLICATIONS

Postel, "Transmission Control Protocol, DARPA Internet Program Protocol Specification," Request for Comments 793, Sep. 1981, 161 pages.

* cited by examiner

TECHNIQUES FOR SECURE SESSION REESTABLISHMENT

CROSS-REFERENCE TO RELATED APPLICATION

This application is a continuation of U.S. patent application Ser. No. 14/576,146, filed on Dec. 18, 2014, entitled "TECHNIQUES FOR SECURE SESSION REESTABLISHMENT," the disclosure of which is incorporated herein by reference in its entirety.

BACKGROUND

Data security is of high importance in many contexts. As an example, organizations often utilize networks of computing devices to provide a robust set of services to their users and the services may utilize multiple different servers. Networks often span multiple geographic and other boundaries and often connect with other networks. An organization, for example, may support its operations using both internal networks of computing resources and computing resources managed by others. Computers of the organization may communicate with computers of other organizations to access and/or provide data while using services of another organization. In many instances, organizations configure and operate remote networks using hardware managed by other organizations, thereby reducing infrastructure costs and achieving other advantages. Further, organizations often have employees with flexible working arrangements which allows for use of organizational computing resources (e.g., servers) both within an internal network and form other locations where communications must traverse a public network, such as the Internet. With such configurations of computing resources, ensuring that access to the resources and the security of the data they hold can be challenging, especially as the size and complexity of such configurations grow.

Many techniques have been developed to enhance data security. For example, Secure Sockets Layer (SSL) Transport Layer Security (TLS) and other protocols allow secure communications over a network between computer systems using symmetric cryptographic keys. Such protocols, however, often involve various disadvantages. For example, handshake processes often involve significant computational resources, which ties up processing capacity and introduces additional latency into communications. Further, network boundaries often create issues whereby, when a computer moves from one network to another, sessions need to be renegotiated.

BRIEF DESCRIPTION OF THE DRAWINGS

Various embodiments in accordance with the present disclosure will be described with reference to the drawings, in which.

DETAILED DESCRIPTION

Figure 1:
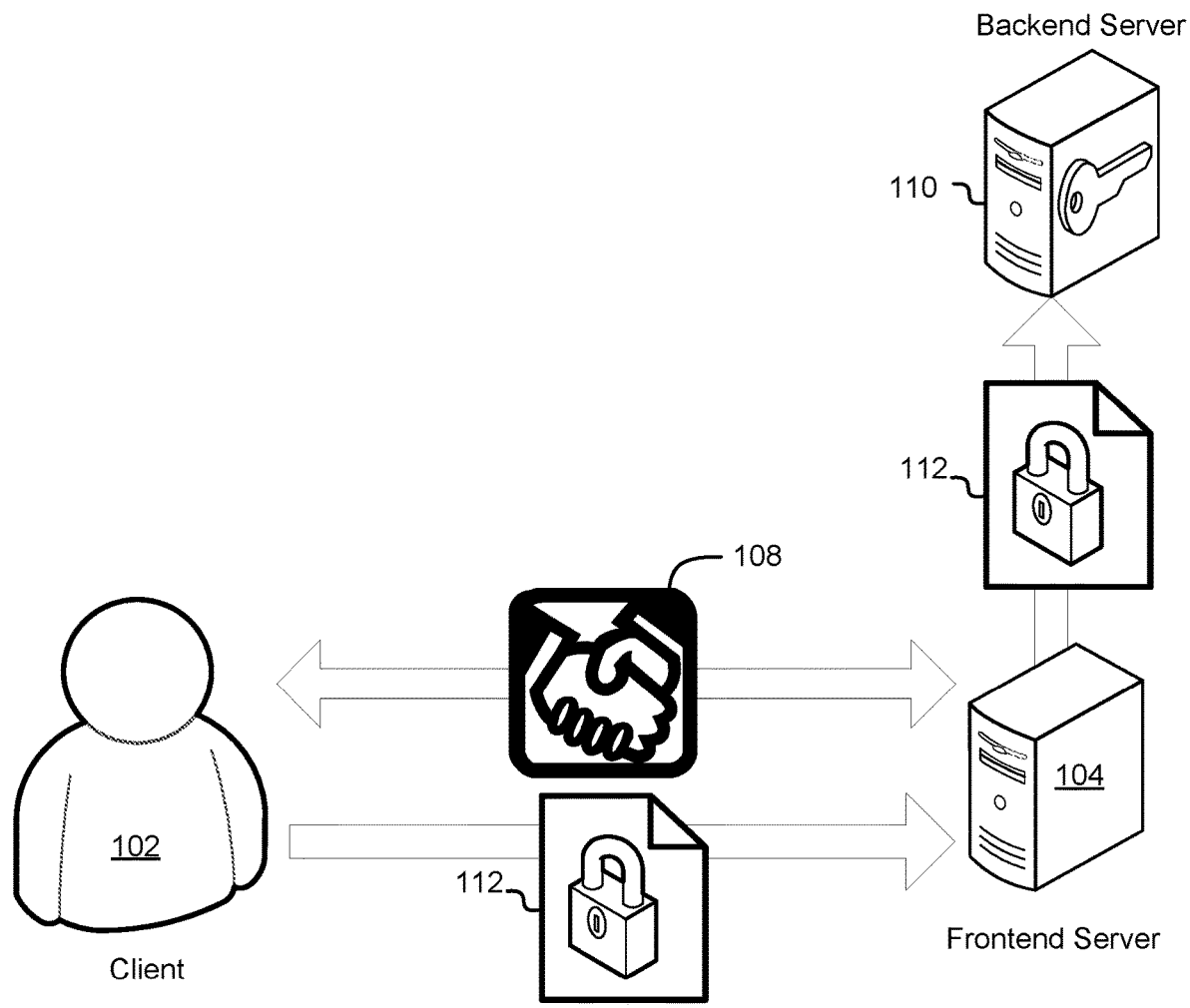
FIG. 1 shows an illustrative example of an environment in which a handshake with a frontend server may be performed to enable the transmission of data through the frontend server without access to the data.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein enhance security of data transmitted among computer systems. In some embodiments, a client completes a handshake process to establish a secure communications channel with a frontend server. As part of the handshake, the client determines a first secret and a second secret. The first secret is exchanged with the frontend server to enable the client and frontend server to securely communicate with one another by exchanging encrypted messages and performing other cryptographic operations, such as message integrity verification. In some examples, the first secret is a cryptographic key while, in other examples, the first secret is cryptographic material usable to derive a set of cryptographic keys (i.e., one or more cryptographic keys. For instance, the first secret may be a premaster secret or a master secret as used in a transport layer security (TLS) protocol handshake.

The second secret may, as the first secret, be a cryptographic key or cryptographic material usable to derive a set of cryptographic keys. Unlike the first secret, however, the second secret is provided to a backend server without providing the frontend server access to the second secret. In this manner, the second secret enables the client and server to securely communicate with one another over a secure communications channel to the exclusion of the frontend server. In some embodiments, communications between the client and backend server pass through the frontend server but, lacking access to the second secret, the frontend server is unable to decrypt communications between the client and backend server. Thus, a compromise of the frontend server or other event in connection with the frontend server is unlikely to compromise communications between the client and the backend server.

In some embodiments, the frontend server proxies communications of a handshake process of a handshake protocol between a client and a backend server. A secret is provided from the client to the backend server, thereby enabling the client to securely communicate with the backend server. The secret may be, for instance, a premaster secret or master secret as used in a TLS handshake or other cryptographic material usable to derive a set of cryptographic keys. The secret is used by the backend server to derive a set of cryptographic keys, such as one or more keys for encryption/decryption and one or more keys for message integrity verification.

The backend server may selectively provide one or more of the derived keys to a frontend server to enable the frontend server to perform at least some cryptographic operations involved in secure communications from the client. For example, a decryption key derived from the secret may be provided to the frontend server to enable the frontend server to decrypt messages from the client. As another example, a data integrity key may be provided to the frontend server to verify the integrity of messages transmitted by the client. In embodiments when less than all derived keys are provided to the frontend server, the frontend server is prevented from successfully performing certain cryptographic operations (i.e., those cryptographic operations for which the keys lacked by the frontend server are necessary). Thus, the effect of a breach of the frontend server can be minimized by providing less than all keys utilized in secure communications with the client.

In some embodiments, techniques of the present disclosure allow for resumption of TLS or other secure sessions over different transmission control protocol (TCP) or other connections. In an embodiment, a client negotiates a secure session with a server over a first TCP connection and, perhaps, exchanges messages in over the negotiated secure session. At some point after establishment of the connection, the connection is terminated, otherwise no longer used, or continued to be used. The client may then resume the secure session with the backend server over a different connection, which may be a connection with a different server (e.g., frontend server). The different connection may be an existing connection or a new connection that is established. This connection may be used to multiplex multiple secure sessions (e.g., multiple secure sessions of the same type (e.g., TLS sessions) and/or different secure sessions of different types).

As an illustrative example, a user may utilize a notebook computer in a corporate environment, connecting to a corporate local area network (LAN). The notebook computer (e.g., via executable instructions of a browser or other application) may establish a TCP connection with a first server within the corporate network and, over the TCP connection, establish a TLS session with the first server. When the user goes home and brings the notebook computer with him/her, the TCP connection may be terminated. At home (or another location), the notebook computer may establish a TCP connection with a second server through which communications to the first server may be made. The notebook computer may communicate with the first server, through the second server, over the same TLS session that was previously established with the first server over the previous TCP connection. Further, multiple TLS sessions with different servers may be resumed by the notebook computer over the same TCP connection with the second server.

FIG. 1 shows an illustrative example of an environment 100 in which various embodiments can be practiced. In this example, the environment 100 includes a client computer system 102 (also referred to as a "client" for short), a frontend server 104, and a backend server 106. The client 102 may be a computer system configured with executable instructions for a client application whereby execution of the client application enables the client 102 to communicate with the frontend server 104. Communications between the client 102 and the frontend server 104 may occur over a network such as described in more detail below.

The frontend server 104 may be a computer system configured with executable instructions that when executed cause the computer system to operate as a server, such as by processing requests submitted by the client 102. The backend server 106 may similarly be a computer system configured with executable instructions that when executed cause the computer system to operate as a backend server such as by processing requests submitted by the frontend server 104. In some examples, the frontend server 104 is configured to be a point of access into functionality provided by a service provider. The frontend server 104 may, for instance, manage sessions of the client 102 with the service provider, where the sessions may be utilized for the utilization of the service provider's services. In an illustrative example, the service provider may be an electronic commerce service provider and the client 102 may communicate with the service provider through the frontend server 104 for engaging in electronic commerce activities, such as browsing an electronic catalogue of items offered by the service provider for consumption. The session may be used to track state associated with the client 102, such as by matching the client 102 to an account of the service provider, tracking items placed into an electronic shopping cart of the service provider, and other related activities. The techniques described herein may be used to manage which information the frontend server 104 has access to, for instance, by allowing sensitive ordering information (e.g., credit card numbers) to pass through the frontend server to a backend server of an order management system without the frontend server 104 being able to access the sensitive information in plaintext form.

Communications between the frontend server 104 and the backend server 106 may occur over a computer network such as described below. In an illustrative example, in some embodiments, the client 102 communicates with the frontend server 104 over the Internet while the frontend server 104 communicates with the backend server 106 over a local area network (LAN). It should be noted, however, that while a client 102, a frontend server 104, and a backend server 106 are provided for the purpose of illustration, computer systems different from those explicitly illustrated in FIG. 1 are considered as being within the scope of the present disclosure. For example, in some embodiments operations described as performed by the frontend server 104 may be performed by a computing device that is not properly classified as a server. For example, in place of the frontend server 104, the environment 100 could have a network appliance such as a network gateway device or a network router configured with executable instructions performing various operations described herein. Further, while the terms "frontend" and "backend" are used for the purpose of illustration of some embodiments, computer systems configured to employ techniques described herein may be otherwise classified in accordance with their primary purpose.

Turning to the specifics of the techniques illustrated in FIG. 1, in an embodiment, the client 102 and the frontend server 104 perform a handshake 108. A handshake 108 may be a process by which two computing entities negotiate parameters of a session and, in the example of FIG. 1, parameters of a session of an encrypted communications session. For instance, in some embodiments, the handshake 108 is a secure socket layer (SSL) handshake or a transport layer security (TLS) handshake. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish a secure channel. Other protocols implemented below the application layer of the Open Systems Interconnect (OSI) model may also be used and/or adapted to utilize techniques described herein. It should be noted that the techniques described herein are adapatable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

In an embodiment, the handshake 108 is performed by the client 102 and the frontend server 104 to negotiate cryptographic keys used in secure communications. In particular, in the embodiment illustrated in FIG. 1, the handshake 108 is used to negotiate a cryptographic key 110 utilized by the backend server for the communication of data from the client 102. In some examples, negotiation of a cryptographic key is a process by which multiple computer systems securely and mutually determine a symmetric cryptographic key that can be used for encryption and decryption. Such negotiations often include use of asymmetric cryptography for the exchange of cryptographic material, such as one or more symmetric cryptographic keys or information from which one or more symmetric cryptographic keys can be derived.

In some embodiments, the handshake 108 includes the negotiation of two sets of cryptographic keys, the first set being for and accessible to the frontend server 104, and the second set being for and available to the backend server 106. In an embodiment, the handshake 108 is performed such that the frontend server 104 lacks access to a cryptographic key 110 negotiated during the handshake 108. In this manner, the client 102 can transmit encrypted data 112 (encrypted using the cryptographic key 110) to the backend server 106 through the frontend server 104 without the frontend server 104 or another computer system having access to data received by the frontend server 104 having the ability to decrypt the encrypted data 112 without the expenditure of extraordinary computing resources, such as through a cryptographic attack. In this manner, the frontend server 104, which may be accessible to the general public via the Internet, is prevented from accessing data in plaintext form when the client 102 encrypts the data so as to be decryptable using the cryptographic key 110. Thus, if the frontend server 104 is compromised, such a comprise does not by itself allow for the compromise of data transmitted from the client 102 to the backend server 106. The backend server 106 may be protected using various measures such as a firewall to lessen the chance that the backend server is compromised.

It should be noted that, while not illustrated in FIG. 1, the client 102 may transmit encrypted data to the frontend server 104 so as to be decryptable by the frontend server 104 using a cryptographic key negotiated during the handshake 108. Thus, the client 102 can encrypt data using appropriate cryptographic keys so as to be decryptable by either the frontend server 104 or the backend server 106 as determined by the client 102. Further, note that a cryptographic key shared between the client 102 and the frontend server 104 may be unavailable to the backend server 106, thereby preventing the access of certain data sent to the frontend server 104 in the event the backend server 106 is compromised.

As with all environments described herein, variations are considered as being within the scope of the present disclosure. For instance, FIG. 1 shows an environment 100 involving a frontend server and a single backend server 106. The techniques described in connection with FIG. 1 and elsewhere herein are also adaptable to other environments such as environments where multiple different backend servers are accessible via the frontend server 104. A handshake 108 may be performed so as to negotiate keys among the plurality of backend servers such that the client is able to encrypt data to be decryptable by a corresponding backend server without that data being decryptable by the frontend server 104 or other backend servers involved in the handshake 108. As yet another example of the variation considered as being within the scope of the present disclosure, the handshake 108 may involve negotiation of yet another key with yet another server which is accessible via the backend server 106 through the frontend server 104 or otherwise. Other variations are also considered as being within the scope of the present disclosure.

Figure 2:
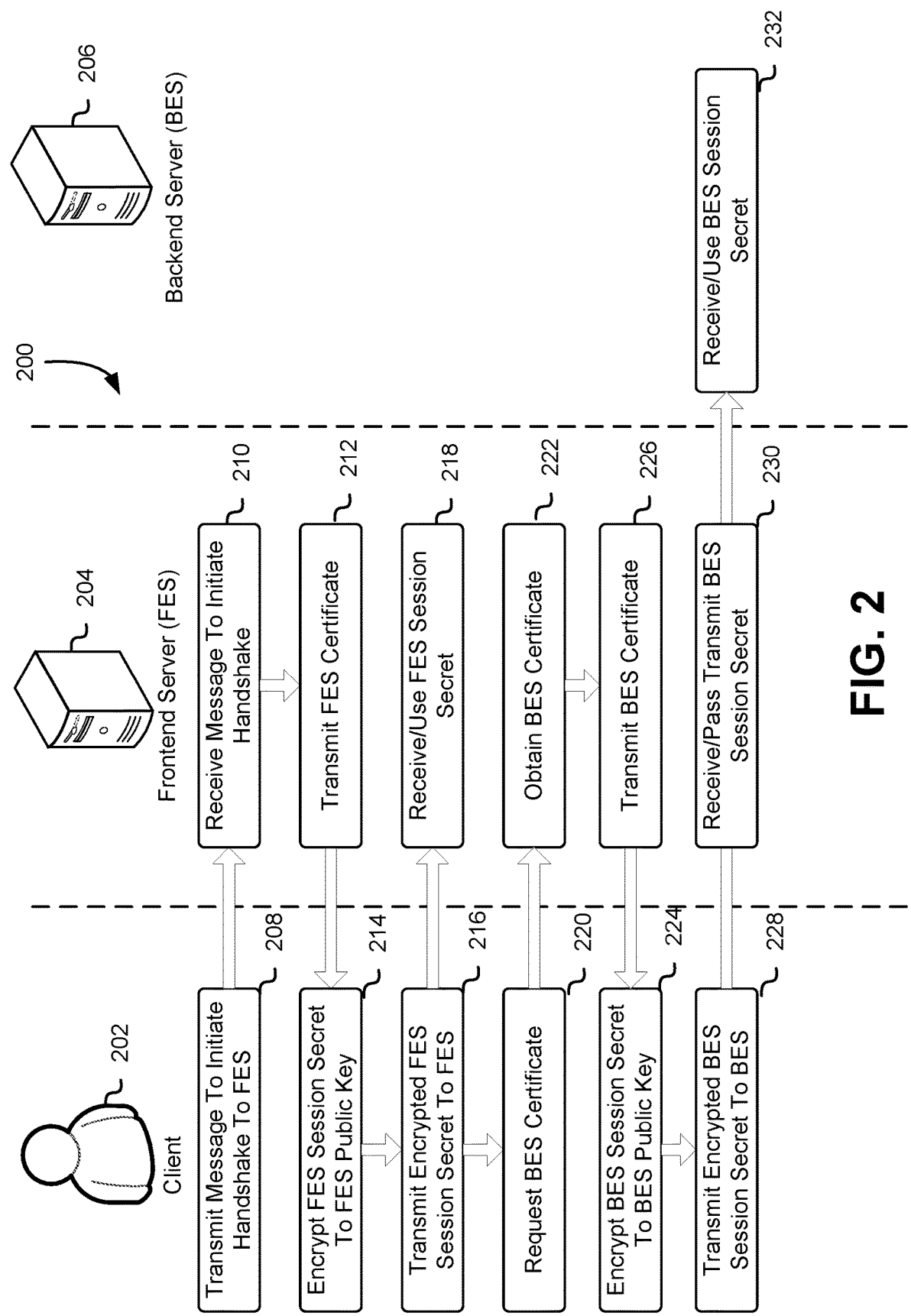
FIG. 2 shows a diagram illustrating communications among various computing entities involved in the environment discussed above in connection with FIG. 1.

FIG. 2 shows an illustrative example of a diagram illustrating communications among various computing entities in accordance with an embodiment. In this particular example, diagram 200 illustrates communications between a client 202, a frontend server 204 and a backend server 206. Although, as with FIG. 1, the entities participating in the communications may be computing entities classified differently than their labels indicate in FIG. 2.

In an embodiment, the client 202 initiates performance of a handshake process with the frontend server 204. In this example the client 202 transmits 208 a message to the frontend server 204 to initiate a handshake. The message may be formatted in various ways in accordance with various embodiments. For example, the message may be formatted as a ClientHello message in accordance with a TLS protocol. Generally the message may be any message that indicates to the frontend server 204 initiation of the handshake process. The frontend sever 204 may receive 210 the message to initiate the handshake, and as a result of having received the message to initiate the handshake, the frontend server 204 may transmit 212 a frontend server certificate to the client 202.

The frontend server certificate 212 may be an electronic document usable to prove ownership of a public cryptographic key of a public/private key pair. The document may also be referred to in certain contexts as a digital certificate or an identity or a public key certificate. While embodiments of the present disclosure are not limited to such certificates, in some embodiments the frontend server certificate is configured as a x.509 certificate. The frontend server certificate 212 may be used to prove ownership of a public key by having been digitally signed, that is including a digital signature, of an entity which the client 202 is configured to trust. By being configured to trust an entity, the client 202 may have programming logic that enables the client 202 to perform one way when the digital signature of the certificate is valid and another way when the digital signature of the certificate is invalid. The client 202 may determine that the digital signature is valid when the digital signature is both correct and verifiable using a cryptographic key that the client 202 associates with an identity that purportedly digitally signed the certificate. Note that, while certificates are used for the purpose of illustration, other ways of indicating to the client a public cryptographic key to use is considered as being within the scope of the present disclosure.

Once the client 202 receives the frontend server certificate that was transmitted 212 by the frontend server 204, the client 202 may encrypt a frontend server session secret to a frontend server public key. The frontend server session secret may be information that comprises a set of cryptographic keys and/or information usable to derive a set of cryptographic keys. Using the example of TLS, the session secret may be a pre-master secret or a master secret usable by the frontend server to derive a set of keys for use in a TLS session. Other examples are also considered as being within the scope of the present disclosure.

The public key used by the client 202 to encrypt 214 the frontend server session secret to the frontend server public key may be a public key included in, referenced by, or otherwise specified by the frontend server certificate. The client 202 may encrypt 214 the frontend server session secret to the frontend server public key by inputting the frontend server session secret and the frontend server public key into an asymmetric cryptographic encryption algorithm so as to be decryptable by a private key corresponding to the frontend server public key. The private key may be, for example, a cryptographic key maintained as a secret by the frontend server 204. Once the client 202 has encrypted 214 the frontend server session secret to the frontend server public key, the client 202 may transmit 216 the encrypted frontend server session secret to the frontend server 204.

The frontend server 204 may receive 218 the frontend session secret and may use the frontend session secret to communicate with the client 202 over a secure channel (e.g., a TLS session). For example, the frontend server 204 may decrypt the frontend server session secret using a private key corresponding to the public key specified by the frontend server certificate 212 and use the decrypted frontend server session secret to encrypt messages, to decrypt message, to verify the authenticity of messages, and to provide information that proves authenticity of messages transmitted by the frontend server 204. It should be noted that by using the frontend server session secret, the frontend server 204 may input the frontend server session secret into a cryptographic algorithm, thereby using the frontend server session secret directly or by deriving a set of cryptographic keys and inputting a derived cryptographic key into a cryptographic algorithm, thereby indirectly using the frontend server session secret.

At some point after having transmitted the encrypted frontend server session secret to the frontend server, the client 202 may request 220 a backend server certificate. The client 202 may request the backend server certificate such as by transmitting a request to the frontend server 204 for the backend server certificate. The request may be a communication configured to cause the frontend server 204 to obtain and abide the backend server certificate. The request may be encrypted so as to be decryptable by the frontend server or, in some embodiments, unencrypted. If encrypted, the request may be encrypted using a public key of the frontend server or a symmetric cryptographic key exchanged with the frontend server. Accordingly, the frontend server 204 may receive the request for the backend server certificate and as a result may obtain 222 the backend server certificate.

The backend server certificate may be obtained 222 by the frontend server 204 in various ways in accordance with various embodiments. In some examples, the frontend server 204 transmits a request to the backend server 206 for the backend server certificate and the backend server 206 provides the backend server certificate in response. The backend server certificate may be configured such as the frontend server certificate described above, although it may have different information encoded therein, such as a public key corresponding to a private key maintained as a secret by the backend server 206. In another example of how the frontend server 204 may obtain 222 the backend server certificate, the frontend server 204 may have the backend server certificate in a local or other data store accessible to the frontend server 204. The frontend server 204 may maintain the backend server certificate in a local data store and/or in a cache. Generally, any way by which the frontend server 204 may obtain 222 the backend server certificate is considered as being within the scope of the present disclosure.

Once the frontend server 204 has obtained 222 the backend server certificate, the frontend 204 may transmit 226 the backend server certificate to the client 202. The client 202 may receive the backend server certificate from the frontend server 204 and, having received the backend server certificate, may encrypt a backend server session secret to a backend server public key specified by the backend server certificate. The backend server session secret may be information configured such as the frontend server session secret, although it may be different from the frontend server session secret. For example, the backend server session secret may be information that includes a set of cryptographic keys and/or cryptographic material usable to derive a set of cryptographic keys, where the cryptographic keys are usable for secure communications between the client 202 and to the backend server 206.

Note that various techniques may be employed to enable the client 202 to determine that the backend server certificate is authentic and is not, for example, a certificate that was substituted by a man-in-the-middle. For example, the certificate may be digitally signed by a cryptographic key shared as a secret with the client computer system (e.g., a pre-shared cryptographic key). As another example, the certificate may have been previously digitally signed by the client 202 or by another computer system the client 202 is configured to trust. Generally, the backend server certificate may contain and/or may otherwise be provided with cryptographic proof that binds the backend server 206 to the backend server certificate. The client, accordingly, may be configured to verify the cryptographic proof to determine whether to encrypt a backend server session secret and provide the encrypted backend session secret.

Having encrypted 224 the backend server session secret to the backend server public key, the client 202 may transmit 228 the encrypted backend server session secret to the backend server 206. The client 202 may transmit 228 the encrypted backend server session secret to the backend server in various ways and according to various embodiments. For example, the client 202 may transmit 228 the encrypted backend session server secret in a message to the frontend server 204. The message may include information (e.g., using a field in a TCP/IP header, using a Server Name Indication (SNI) or otherwise) that enables the frontend server 204 to determine to forward the message and/or information derived from the message to the backend server 206. The message may include, for example, a value in a field that indicates to the frontend server to transmit the message or information contained therein or otherwise derived therefrom to the backend server 206. Accordingly, the frontend server 204 may receive 230 the backend server session secret and transmit the backend server session secret to the backend server 206. The backend server 206 may receive 232 the backend server session secret and may use the backend server session secret to communicate with the client 202.

Variations of how the frontend server 204 can determine whether to pass the message on to a backend server are considered as being within the scope of the present disclosure. In some examples, the client 202 first encrypts a message for decryption by the backend server. The message may explicitly or implicitly indicate that it should be processed by the backend server. The client 202 may then encrypt the encrypted message for decryption by the frontend server. The frontend server may, upon receiving the doubly (or greater) encrypted message (which, as a result of the manner in which the encrypted message was generated, the frontend server lacks an ability to fully decrypt), may perform a decryption, then pass on the partially decrypted result (i.e., the message encrypted for decryption by the backend server) to the backend server. As another example, a communication generated by the client 202 may include multiple encrypted components that comprise a first component decryptable by the frontend server and a second component decryptable by the backend server. The frontend server 204 may decrypt the first component, use the decrypted first component to determine how to proceed and, if applicable, transmit the second component to the backend server. The first component may specify or otherwise indicate the backend server to transmit at least the second component to. As yet another example, the frontend server may receive an encrypted message, decrypt the encrypted message using a key shared between the client 202 and the frontend server 204, and attempt to process the result. If processing the result of the decryption fails, the frontend server 204 may pass the encrypted message to the backend server 206. Other variations, including combinations of the techniques described explicitly herein, are also within the scope of the present disclosure.

Communications with the client 202 may occur in various ways in accordance with various embodiments. For example, in some instances, the client 202 encrypts information so as to be decryptable by the backend server using the backend server session secret directly or indirectly, such as described above. Similarly, the backend server may utilize the backend server session secret to encrypt messages so as to be decryptable by the client 202. Messages transmitted between the client 202 and the backend server 206 may be encrypted so as to be undecryptable by the frontend server 204 despite the encrypted messages passing through the frontend server 204. For example, implementing the techniques described herein, the backend server session secret may be information maintained as a secret between the client 202 and the backend server 206 and inaccessible to the frontend server 204. In this manner, technical advantages, including increases to data security, are achieved by utilization of the techniques described herein.

Figure 3:
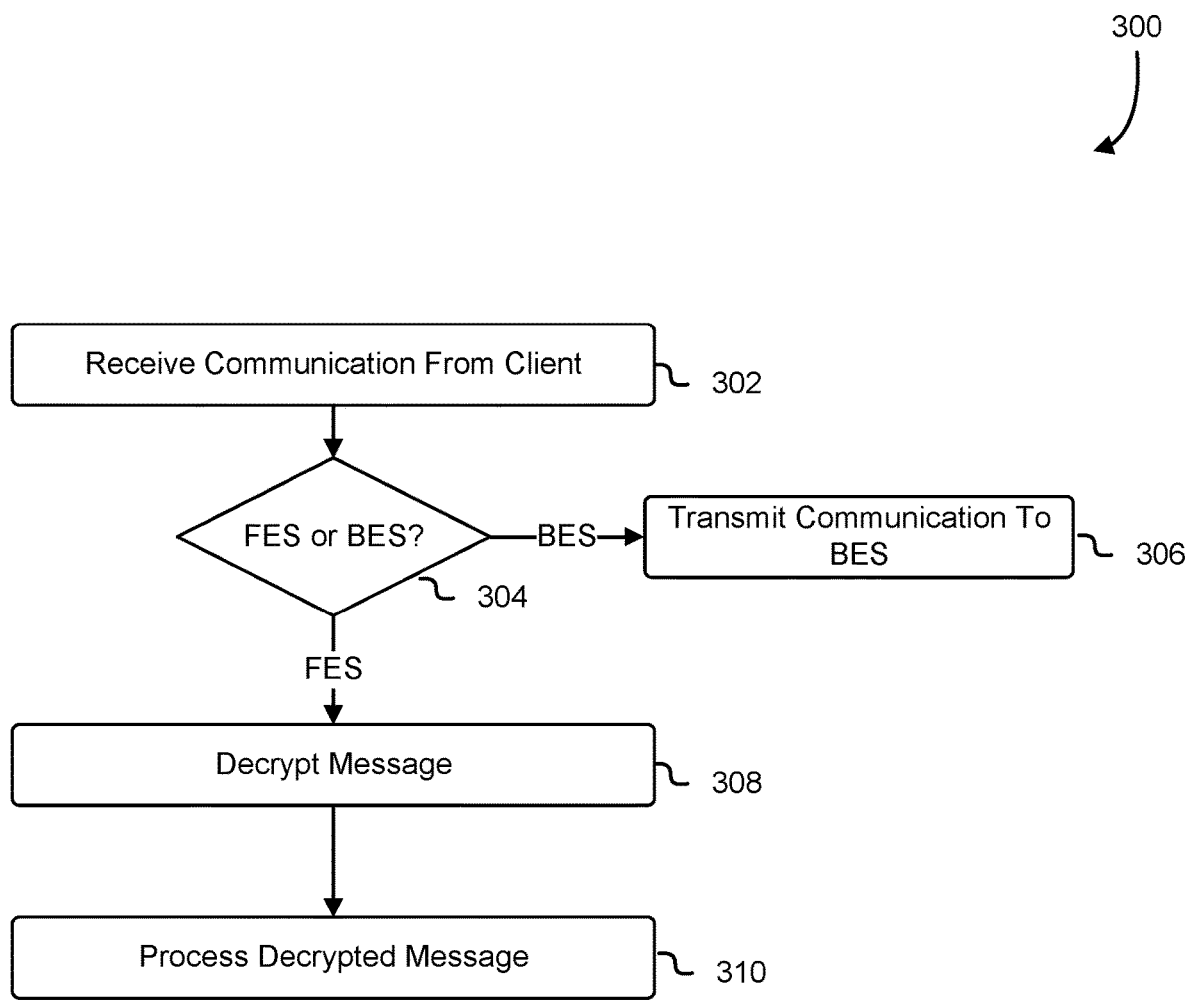
FIG. 3 shows an illustrative example of a process for processing received communications in accordance with an embodiment.

FIG. 3 shows an illustrative example of a process 300 for processing incoming communications in accordance with an embodiment. The process 300 may be performed by any suitable system or component thereof, such as by the frontend server discussed above. In an embodiment, the process 300 includes receiving 302 a communication from a client computer system, such as described above. For this particular example, the process 300 is described as being performed by a frontend server. In some examples, the communication is a transmission control protocol (TCP)/Internet protocol (IP) (TCP/IP) packet, which may contain an encrypted TLS record, although different types of communications are considered as being within the scope of the present disclosure, such as user datagram protocol (UDP) packets (datagrams). Generally, the communication may contain a message, which may be encrypted in accordance with an encrypted communications protocol, such as TLS. Note that the term "communication" may be used interchangeably to mean both a message and a collection of data (e.g., a TCP/IP packet) in which the message is contained and, when the term "communication" is used, its meaning will be clear from context. The communication may be received directly (e.g., over a physical or wireless connection) or indirectly (over a network through one or more intervening devices). Generally, the communication may have originated from the client computer system. Upon having received 302 the communication from the client computer system, in an embodiment, the system performing the process 300 determines an operation to perform from a plurality of operations that the system is configured to perform. In some embodiments, the set of operations the system is configured to perform includes decrypting the communication itself and transmitting the communication to another computer system, such as a backend server.

Accordingly, in an embodiment, the process 300 includes determining 304 whether the communication should be processed by the frontend server or a backend server. In some embodiments, there may be multiple servers (e.g., frontend and/or backend) in addition to a frontend server and a backend server and the determination 304 may be a selection from the servers for processing of the communication that was received 302. The determination 304 may be made in various ways in various embodiments. For instance, in some embodiments, the communication is a packet and a header in the packet indicates whether the communication is to be processed by the frontend server or the backend server. As another example, the communication may include server name indication (SNI) in accordance with a TLS protocol and the frontend server may use the SNI to determine which system is to ultimately receive the communication (e.g. an encrypted TLS record in a payload of a packet that was received 302). The frontend server may, for instance maintain a mapping (e.g., a table) of SNIs to IP addresses and use the mapping to determine how to route the communication when applicable. Generally, information in the communication may be used to determine whether to process the communication or to transmit the communication to a backend server. Such information in the communication may be external to an encrypted message in the communication to enable the frontend sever to make such a determination without the need to decrypt the encrypted message, thereby allowing transmission of encrypted messages to backend servers without providing access to certain data to the frontend server.

If the frontend server performing the process 300 determines that a backend server is to receive the communication, the frontend server may transmit 306 the communication to the backend server, such as by forwarding the communication to the backend server. Note that other operations may be performed, such as encapsulating the packet for traversal of a network, extraction of the payload into another type of communication, network address translation, and/or other operations that may be applicable in various embodiments. Further, note that, as discussed above, when determined 304 to transmit the communication to the backend server, the frontend server may lack the ability to decrypt the communication because, for instance, the frontend server may not have access to a decryption key that was negotiated or that is otherwise shared (e.g., pre-shared) between the client computer system and the backend server. The backend server may then access a decryption key, decrypt the communication and process the communication in accordance with programming logic that configures the backend server.

If the frontend server performing the process 300 determines 306 that the frontend server is to receive the communication that was received 302, the frontend server may process the communication accordingly. As illustrated in FIG. 3, the frontend server may decrypt 308 the message contained in the communication. For instance, the frontend server may use a decryption key that was negotiated with the client computer system as part of a handshake process of a handshake protocol or that is otherwise shared with the client computer system to decrypt the message. Once the message has been decrypted, the frontend server may process 310 the decrypted message in accordance with logic with which the frontend server is configured (e.g., programming logic of an application of the server).

Figure 4:
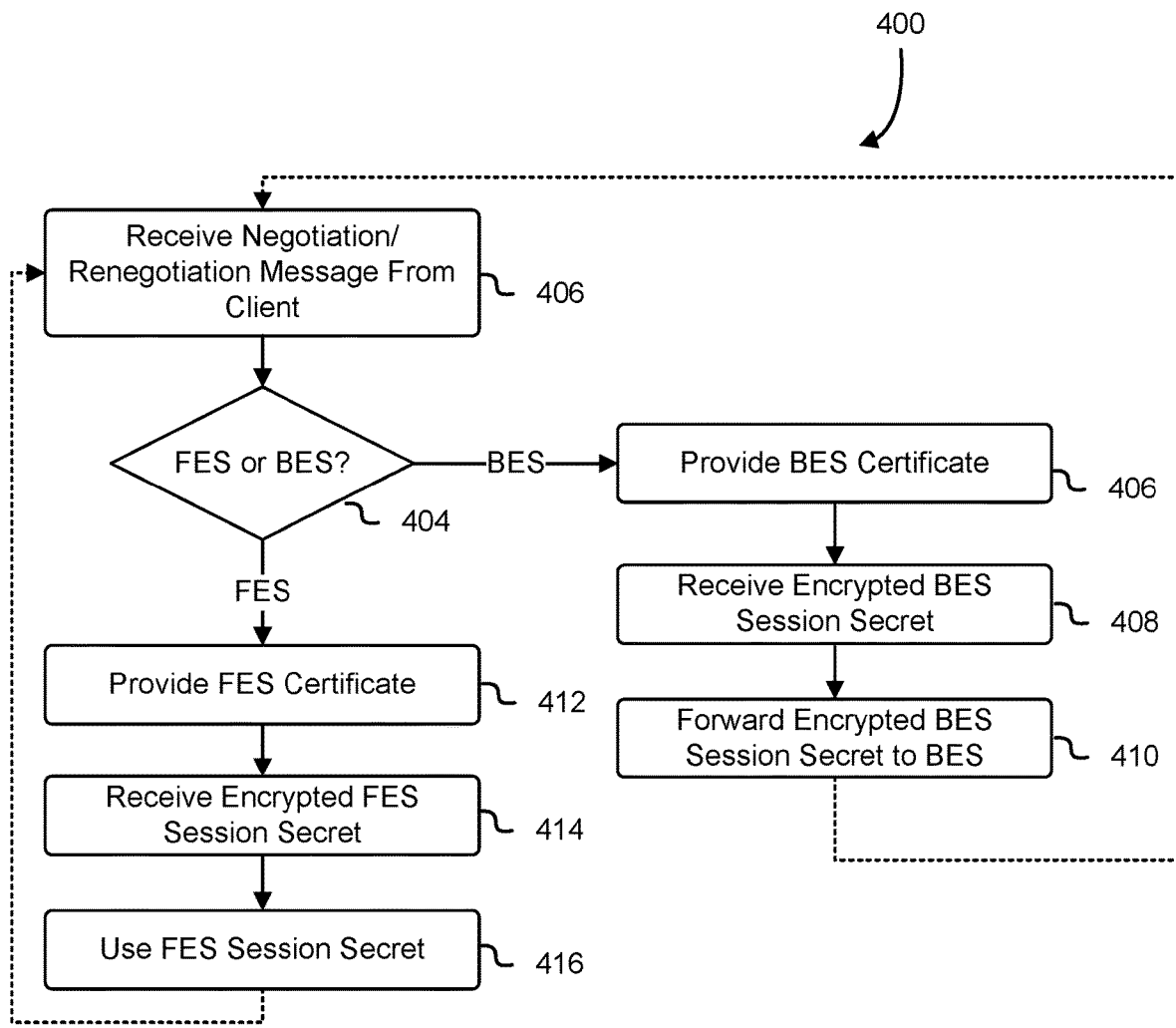
FIG. 4 shows another illustrative example of a process for processing received communications in accordance with an embodiment

As noted, there are different ways in which data may be transmitted to/through a frontend server to selectively render data decryptable to the frontend server. FIG. 4 shows an illustrative example of a process 400 which may be performed alternatively or in addition to the process 300, discussed above. The process 400 may be performed by any suitable system or component thereof, such as a frontend server, such as described above. In an embodiment, a client computer system uses messages of a certain type to toggle between having communications processed by a frontend server and having communications processed by a backend server and, in some examples, between the frontend server being able to decrypt messages sent to the frontend server and being unable to decrypt messages sent to the frontend server. Note that, as with FIG. 3, while FIG. 4 is described in connection with a frontend server and a backend server, for the purpose of illustration, the process 400 can be adapted to involve more than two servers.

Turning to the specifics of the embodiment illustrated in FIG. 4, in an embodiment, the process 400 includes receiving a negotiation or renegotiation message from a client computer system. The message may be received, for example, in a packet received by the frontend server performing the process 400. A negotiation message, in an embodiment, is a message that indicates to the frontend server (i.e., because the frontend server is configured to distinguish the negotiation message from other types of messages) to negotiate an encrypted communications session (e.g., an SSL or TLS session) with the client computer system, such as by performing a handshake process of a handshake protocol. An example negotiation message is a TLS ClientHello message. A renegotiation message, in an embodiment, is a message that indicates to the frontend server to renegotiate an encrypted communications session (e.g., by negotiating a different set of cryptographic keys for the session. In some embodiments, a negotiation message and a renegotiation message are of the same type but differ in some respect, such as by a differing value in a field of the message that indicates whether the negotiation to be performed is an initial negotiation or a renegotiation of an already negotiated session. An example renegotiation message is a TLS ClientHello message with client verify data, as defined in RFC 5746, providing a cryptographic binding (i.e., information sufficient for providing access to a set of cryptographic keys negotiated for the current or a previous session) to an existing or previous session. Other messages for other protocols are also considered as being within the scope of the present disclosure.

Once the negotiation/renegotiation message has been received 402, the process 400 may include determining 404 whether a session to be negotiated is for the frontend server or the backend server. Generally, the frontend server performing the process 400 may determine for which of a plurality of servers the session is to be negotiated. The determination 400 of the server for which the session is to be negotiated may be made in various ways in various embodiments. For instance, in some embodiments, the frontend server maintains a state machine and toggles or otherwise cycles through a set of servers, each renegotiation message indicating a next server in a cycle. In other embodiments, information in the message or in a communication that contains the message (e.g., a TCP/IP packet header) indicates the server for which the session is to be negotiated and the frontend server uses such information for the determination 404. SNI, such as described above, may also be used.

If it is determined 404 that the session to be negotiated is for the backend server, the frontend server may obtain and provide 406 (e.g., transmit over a network) a digital certificate for the backend server to the client computer system. An example certificate is an x.509 certificate. The digital certificate may include or otherwise specify a public cryptographic key that the client can use to encrypt information so as to be decryptable by the backend server using a private cryptographic key held by the backend sever as a secret (and which is inaccessible to the frontend server). The digital certificate may be provided in accordance with a handshake protocol. Further, the frontend server may obtain the backend server certificate in different ways in different embodiments. For example, the frontend server may have a locally stored copy of the backend server certificate, may send a request to the backend server for the backend server certificate, or may send a request to another system that has a copy of the backend server certificate.

As a result of having provided the digital certificate of the backend server to the client computer system, the client computer system may use the corresponding public cryptographic key to encrypt a session secret (e.g., a premaster secret, master secret, or cryptographic key). The frontend server may receive 408 the encrypted session secret and forward 410 (e.g., transmit over a network) the encrypted session secret to the backend server. Note that, in some instances, the frontend server may not receive an encrypted session secret but another type of message, such as another renegotiate message, causing the frontend sever to perform the determination 404 again.

Having provided the encrypted session secret to the backend server, the frontend server may forward messages to the backend server to enable the backend server to communicate with the client computer system securely and without the frontend server having access to the contents of the messages (i.e., because the frontend server lacks access to a decryption key necessary for decrypting the messages). Note that, while not illustrated in FIG. 4, the frontend server may receive additional types of messages that may be processed appropriately. For instance, in the example of TLS, the frontend server may receive a ChangeCipherSpec message from one of the client computer system and backend server and forward to the other, thereby enabling the client computer system and the backend server to communicate through the frontend server using a TLS record protocol.

If the frontend sever determines 404 that the session is to be negotiated for the frontend server, the frontend server may provide 412 a copy of its digital certificate (i.e., a digital certificate corresponding to a private cryptographic key held by the frontend server as a secret) to the client computer system. The client computer system, having the frontend server's public cryptographic key as a result of receiving the frontend server certificate, may encrypt a frontend server session secret to the public cryptographic key and transmit the encrypted session secret to the frontend server. The frontend server may then receive 414 the encrypted session secret and decrypt the session secret using the private cryptographic key and use 416 the session secret to communicate with the client computer system, e.g., over a TLS record protocol.

As indicated by the arrows with dashed tails, the process 400 may repeat as the client computer system transmits renegotiation messages that are received by the frontend server. In this manner, the client can selectively communicate over encrypted communications channels with the frontend sever and the backend server without providing the frontend server access to plaintext data intended for processing by the backend server. As noted, other operations may be performed as part of the process 400 and the operations that are performed may vary with the specific protocols that are used. For instance, an implementation of the process 400 may also include use of a client digital certificate to enable the frontend server and/or backend server to securely transmit a session secret to the client computer system. In the case of a backend server encrypting the session secret to a public cryptographic key of the client computer system, the frontend server will not have the ability to decrypt the session secret. Other variations are also considered as being within the scope of the present disclosure.

Note that numerous variations of the process 400 in addition to those discussed above are considered as being within the scope of the present disclosure. For example, FIG. 4 shows a process where a renegotiation message from the client computer system can trigger a server (e.g., frontend server) to provide a certificate (either backend or frontend server certificate) that the client can use to switch between session secrets accessible to the frontend server and session secrets inaccessible to the frontend server but accessible to the backend server. In this manner, a client computer system can switch between secrets with little, if any, modification to an implementation of an encrypted communications session protocol. Various optimizations to the process illustrated in FIG. 4 may be used to avoid additional cryptographic operations and, in some examples, cryptographic operations of asymmetric cryptographic algorithms that can be relatively computationally expensive.

As an example, once a client computer system has established an encrypted communications session with both a frontend server and a backend server, use of certificates for the exchange of session secrets may become unnecessary. Accordingly, variations of the process 400 include variations where the client computer system is configured to continue with a previously negotiated session instead of using a provided certificate to encrypt and provide a session secret. Continuing with this example, a renegotiation message from the client computer system may not trigger providing of a frontend server or backend server certificate, but may serve as an indication to the frontend server to switch between processing messages itself and forwarding messages to the backend server. Renegotiation messages may also have different types which indicate, respectively, whether to renegotiate a set of cryptographic keys used with a session or to continue a session using a set of cryptographic keys that was already negotiated.

As another example, different techniques may be used to switch between sessions between the client computer system and the frontend server and sessions between the client and the backend server. For instance, various techniques for resuming encrypted communications sessions (e.g., TLS session resumption) may also be used to switch between sessions and to avoid cryptographic and other computations, e.g., by using abbreviated handshake procedures. Such switching may require server-side state maintenance or may use a technique, such as session tickets, to avoid maintenance of some or all state. Generally, stateless and/or stateful session resumption mechanisms may be used in various embodiments.

Figure 5:
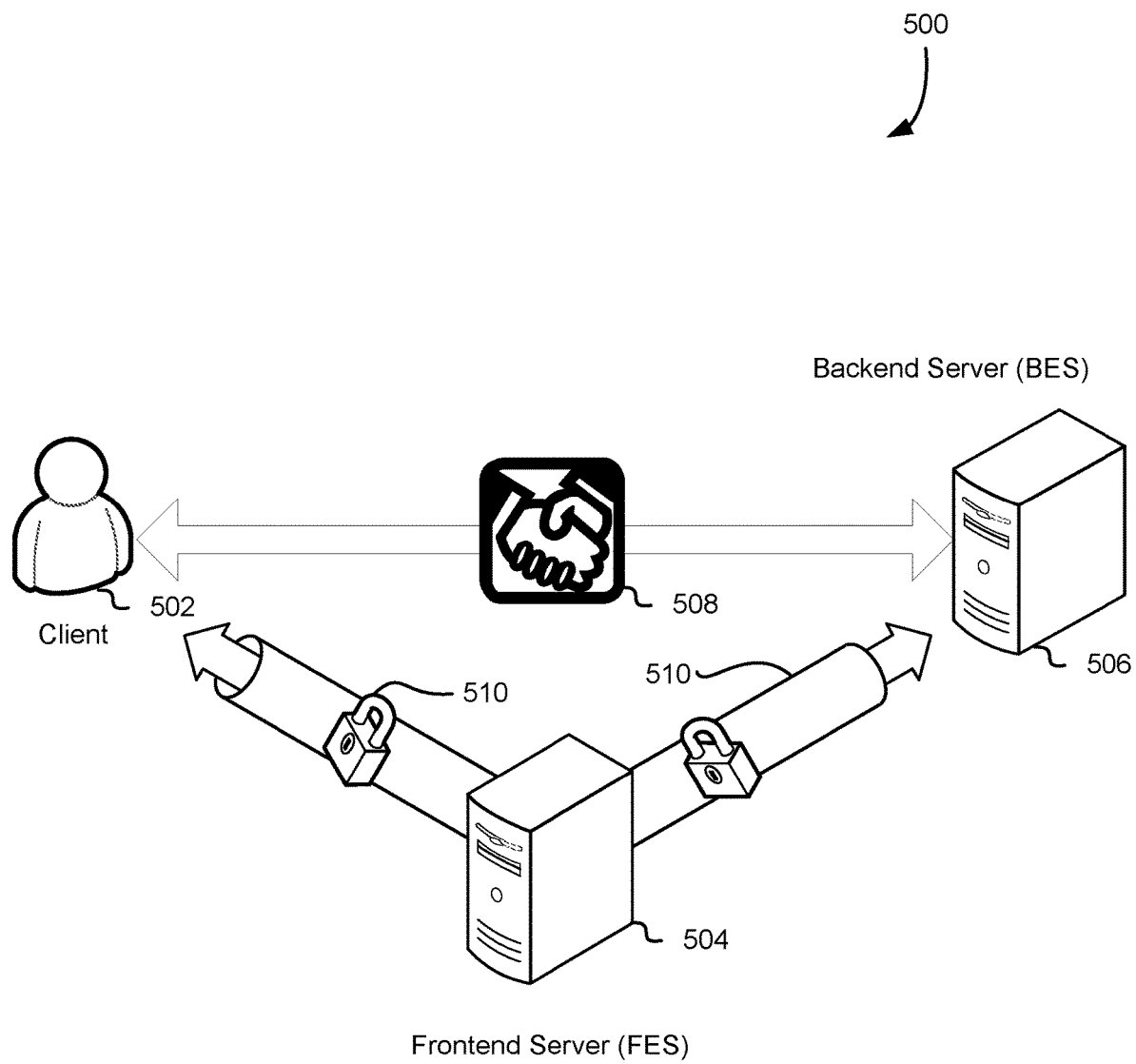
FIG. 5 shows an illustrative example of an environment in which a handshake with a backend server enables secure communications to travel through a frontend server in accordance with an embodiment.

FIG. 5 shows an illustrative example of an environment 500 in which various embodiments can be implemented. In the particular example of FIG. 5, variations of the techniques discussed above are illustrated. In an embodiment, the environment 500 includes a client computer system 502, a frontend server 504, and a backend server 506. The client computer system, backend server 506, and frontend server 504 may be computer systems or components thereof, such as described above and below. In an embodiment, the client computer system 502 performs a handshake process 508 with the backend server 506. The handshake process may be performed in accordance with a handshake protocol, such as a TLS handshake protocol. Generally, the handshake process can be any process through which the client computer system 502 and the backend server 506 negotiate a set of cryptographic keys for the purpose of being able to communicate through encrypted messages that each can decrypt.

In some embodiments, the handshake process between the client computer system 502 and the backend server 506 is performed over a virtual connection (also referred to as a virtual circuit or a network session), such as a TCP connection, established between the client computer system 502 and the backend server 506, although other ways of completing a handshake process are considered as being within the scope of the present disclosure, such as processes where an intermediary computer system proxies the handshake process between the client computer system 502 and the backend sever 504. Generally, a network session may be a collective state of two computing devices, established by communications between the two computing devices to establish the collective state, that enables the computing devices to communicate over a network, such as a packed switched computer network. Example protocols for establishing a virtual connection (network session) include, but are not limited to, those described in RFC 675, RFC 793, RFC 1122, RFC 2581, and RFC 5681. The handshake process, when completed, may result in an encrypted communications session (also referred to as an encrypted communications channel, a secure communications channel, or a secure communication session). The client computer system 502 and the backend sever 504 may communicate over the encrypted communications session, over the virtual connection for some time.

At a later point in time, in accordance with various embodiments, the client computer system 502 continues the secure communications session with the backend server 506, but over a different virtual connection. For instance, as illustrated in FIG. 5, the client computer system 502 may establish a virtual connection (e.g., a TCP connection or a Stream Control Transmission Protocol (SCTP) connection) with another computer system, such as the frontend server 504. Note that the type of virtual connection (e.g., the protocol used) with the frontend server 504 may be the same as or may be different than the virtual connection that was established between the client computer system 502 and the backend server 506. Also, the virtual connection that is made between the client computer system 502 and the frontend server 504 may be established after the virtual connection between the client computer system 502 and the backend server 506 has been terminated, although embodiments where simultaneous virtual connections between the client computer system 502 and the frontend server 504 and between the client computer system 502 and the backend server 506 are considered as being within the scope of the present disclosure.

In some examples, the virtual connection between the client computer system 502 and the backend server 506 may be made over a local area network (e.g., with the backend server lacking a publicly addressable network address (e.g., public IP address)) and the virtual connection between the client computer system 502 and the frontend server 504 is made over a public network (e.g., the Internet) where, for instance, the frontend server has a publicly addressable network address. As an illustrative example, a notebook computer may virtually connect (e.g., establish a TCP connection) with the backend server 506 in a corporate environment (e.g., while a user of the notebook computer (client computer system 502, in this example) is at a place of employment) and then take the notebook computer home and, to continue working using the backend server 506, may connect to the frontend server 506 over the Internet which may act as or provide access to a gateway to the local area network. Note, however, that the backend server 506 and frontend server 504 may be addressable on the same network or on different networks, in various embodiments. Further, while the terms "frontend server" and "backend server" are used throughout for the purpose of illustration, systems employing techniques described herein are not necessarily properly classified as a frontend server or backend server, but may have other primary purposes.

In an embodiment, once having established a virtual connection with the frontend server 504, the client computer system may resume the encrypted communications session 510 that was established with the backend server 506. In particular, the client computer system 502 may encrypt messages to the backend server 504 using an encryption key negotiated during the handshake 508 that was performed with the backend server 504, but transmit the encrypted messages to the frontend server 506 upon establishment of the virtual connection with the frontend server 504. The messages may be tagged (e.g., in packet headers and/or with SNI and/or otherwise) so that the frontend server can distinguish between communications for the frontend server 504 and the backend server 506 and, generally, so that the frontend server 504 can determine when to forward messages to the backend server 506. Note that other techniques may be used, such as by transmitting a message to the frontend server that indicates to the frontend server to forward future messages to the backend server 504. Such a message may indicate, for example, a range of enumerated records of a record protocol or may indicate an indefinite set of messages to be forwarded (e.g., until a different message indicating to stop forwarding is received). Note also that, with this technique, messages encrypted for the secure communications session 510 are not decryptable by the frontend server 504 and, generally, that the techniques allow for a virtual connection with the frontend server 504 to communicate with the backend server 506 without requiring the frontend server to perform at least some decryption operations for the backend server, thereby increasing security and improving computational efficiency.

Figure 6:
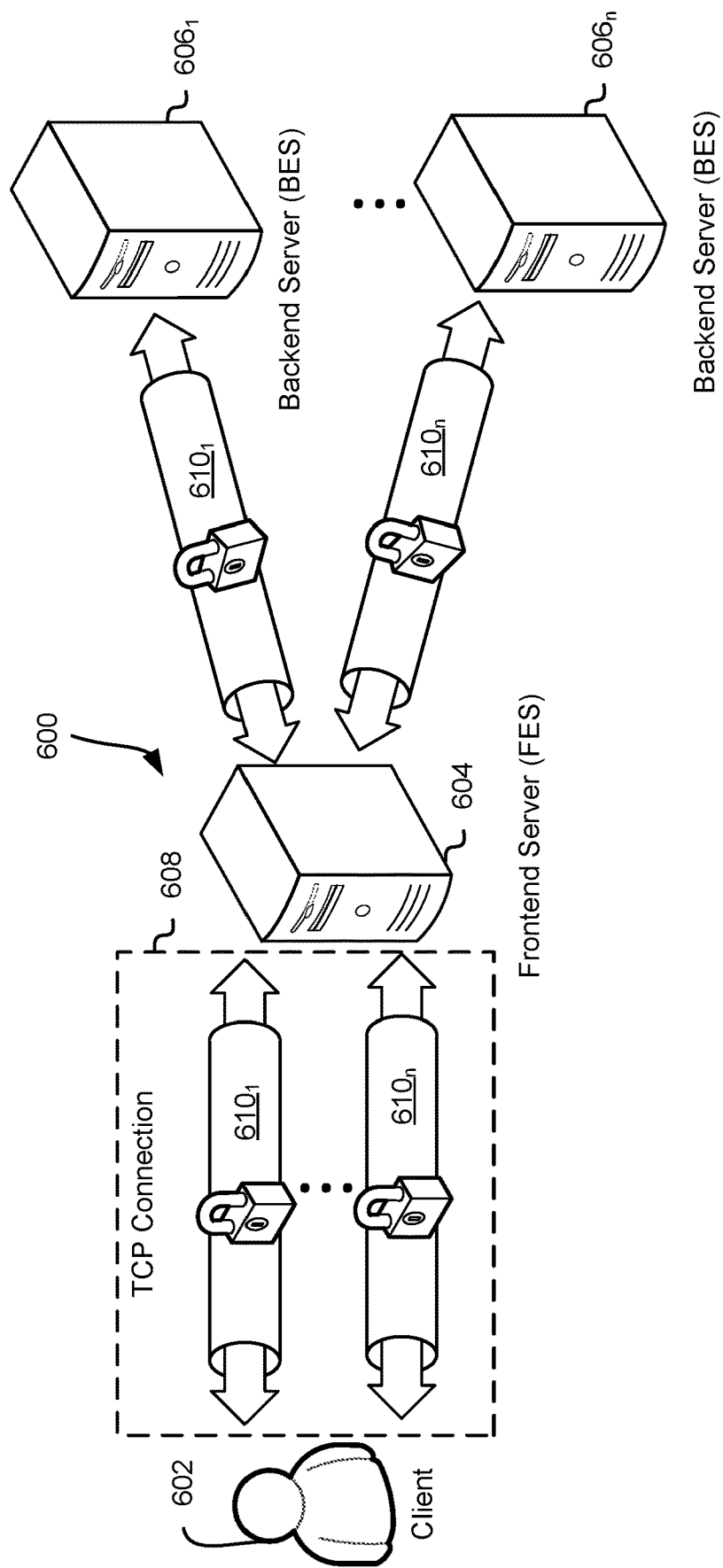
FIG. 6 shows an illustrative example of an environment in which multiple secure communications channels are implemented through a single connection in accordance with an embodiment.

The techniques discussed above in connection with FIG. 5 may be utilized to multiplex multiple secure communications sessions over a virtual connection. FIG. 6, accordingly, shows an illustrative example of an environment 600 in which the techniques discussed above in connection with FIG. 5 may be used to both increase data security and computational efficiency. In an embodiment, the environment 600 includes a client computer system 602 and a frontend server 604, such as described above. Further, in this particular example, the environment 600 includes a plurality of backend servers $606_1$ through $606_n$, each of which may be a backend server such as described above. As above, while the components illustrated in the environment 600 may have particular labels, the types of devices performing various operations may vary in accordance with various embodiments.

As discussed above with FIG. 5, the client computer system may establish encrypted communications sessions $610_1$-$610_n$ with each of a plurality of the backend servers $606_1$-$606_n$ over respective virtual connections, e.g., TCP connections, which will be used throughout the description of FIG. 6 for the purpose of illustration. In an embodiment, the client computer system establishes a TCP connection 608 with the frontend server 604. The client computer system 602 may establish the TCP connection after, for example, terminating one or more TCP connections with one or more backend servers $606_1$-$606_n$ with which one or more respective encrypted communications session $610_1$-$610_n$ has been established. However, as noted, concurrent TCP connections associated with a set of encrypted communications channels are considered as being within the scope of the present disclosure.

As illustrated in FIG. 6, the TCP connection 608 may be used to multiplex multiple encrypted communications sessions $610_1$-$610_n$, that the client computer system has established with different backend servers $606_1$-$606_n$. In this manner, the client computer system 602 can transmit communications for multiple backend servers to the same frontend server 604. The communications may be addressed to the frontend server 604 (e.g., may have a destination IP address assigned to the frontend server). To enable this, the client may include information in the communications that enable the frontend server 604 to distinguish between communications intended for the frontend server and among the backend servers $606_1$-$606_n$. As noted, such information may be in the form of one or more fields in a TCP/IP header, a SNI, or other information. Note that, in embodiments where the frontend server lacks access to a decryption key, the information is external to the messages that are encrypted, thereby allowing the frontend serer 604 to determine where to forward messages without a need to decrypt the messages. As discussed, other techniques may be used to enable the frontend server 604 to determine where to forward communications (or whether to decrypt communications itself), such as by explicit messages from the client that indicate which messages should be proceed to which server.

Numerous variations of the environment 600 are considered as being within the scope of the present disclosure. For example, while omitted from the drawing for the sake of clarity, as with other frontend servers discussed herein, the frontend server 604 may have concurrent TCP connections with different client computer systems and may simultaneously apply techniques described herein concurrently with multiple client computer systems. Further, the frontend server 604 may also be configured to terminate encrypted communications sessions $610_1$-$610_n$ and, as a result, may decrypt some messages while passing other messages to other servers unencrypted. Further, communications between the frontend server 604 and one or more backend servers 606₁-606ₙ may be encrypted by the frontend server 604, e.g., as part of separate encrypted communications sessions 610₁-610ₙ, between the frontend server 604 and backend servers 606₁-606ₙ. As yet another example of variations considered as being within the scope of the present disclosure, different servers may be accessible in different networks. For example, one or more backend servers 606₁-606ₙ may be accessible only via private (e.g., local area) networks. On or more backend servers 606₁-606ₙ may be publicly addressable, e.g., with public IP addresses. Further, different backend servers 606₁-606ₙ may be under the control of different entities and/or may be hosted in different facilities (e.g., data centers). Other variations are also considered as being within the scope of the present disclosure.

Note that, for the purpose of operating with various protocols, computing devices involved in the environment 600 may associate encrypted communications channels with respective virtual connections. A client and/or server may, for instance, associate a TCP connection with a TLS session for the purpose of management of incoming and outgoing communications. When encrypted communications sessions switch virtual connections, a computing device may dissociate and re-associate connections and sessions appropriately. For instance, when a virtual connection is terminated, a client and/or server may dissociate any encrypted communications sessions from the virtual connection (or, in some embodiments, leave the association in place despite the termination). When a new virtual connection is used for the receipt of encrypted communications session communications (e.g., when switching from a backend server to a frontend server or vice versa) the client and/or a server terminating the encrypted communications session may re-associate the encrypted communications session with the current virtual connection. As an illustrative example, a backend server receiving TLS records through a frontend server, where records of the respective TLS session were previously sent directly to the backend server, may re-associate the TLS session from a previous TCP connection with the client to a TCP connection with the frontend server. The frontend server may maintain information that enables the frontend server to transmit TLS records from the backend sever to the client computer system.

Figure 7:
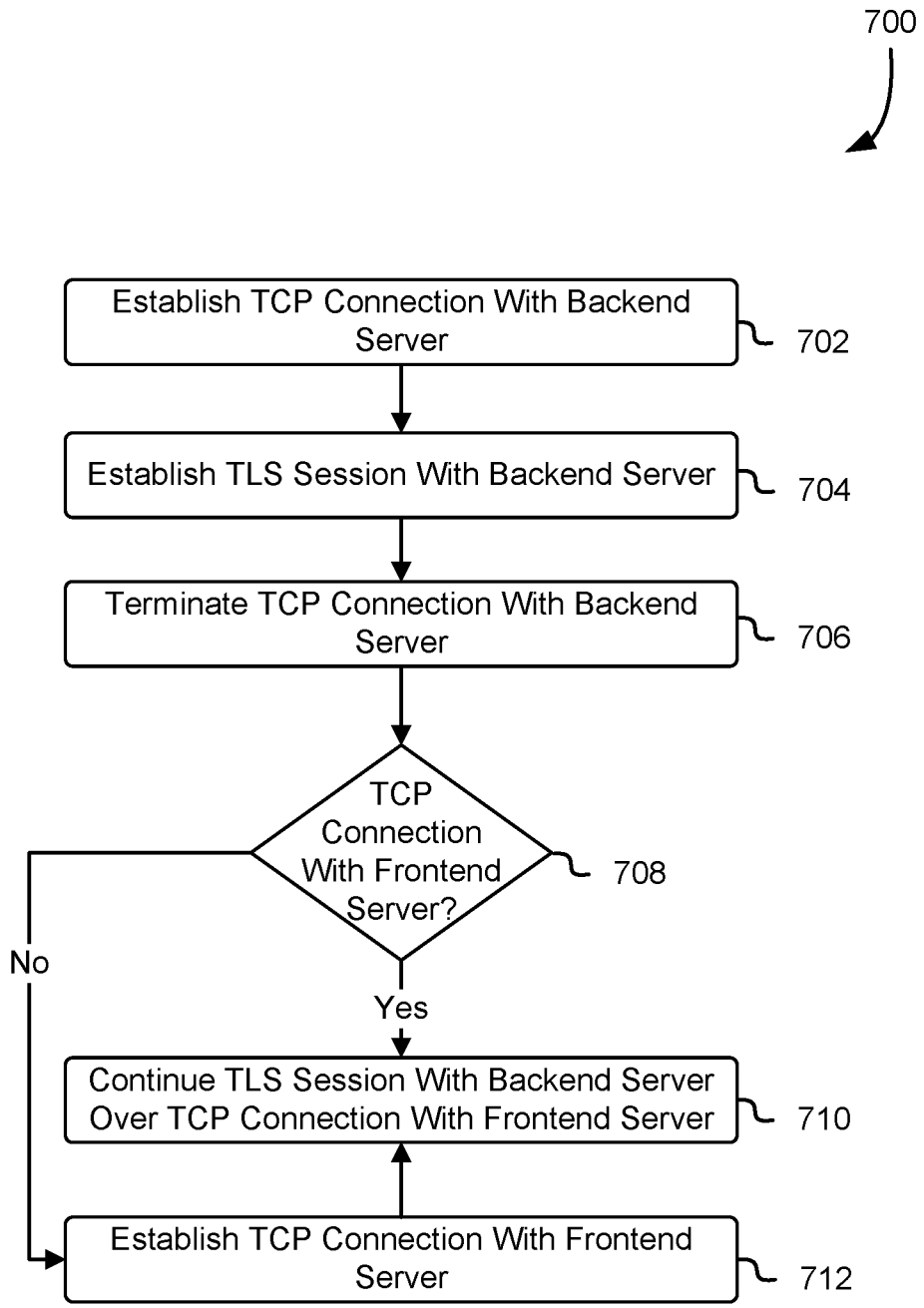
FIG. 7 shows an illustrative example of a process for moving a secure communications channel from one connection to another connection in accordance with an embodiment.

FIG. 7 shows an illustrative example of a process 700 which may be performed to maintain a single encrypted communications session over multiple virtual connections. In this specific example, TCP connections are used as example virtual connections and a TLS session is used as an example encrypted communications session, although the process 700 may be adapted for use with other virtual connections and other encrypted communications sessions. Further, techniques described herein do not necessarily require virtual connections, but other ways of exchanging information, such as using stateless protocols. The process 700 may be performed by any suitable system or component thereof, such as by a client computer system such as described above and also below. Instructions for performing the process 700 may be encoded on a computer-readable storage medium where, when executed by one or more processors of a computer system, the instructions cause the computer system to perform the process 700.

In an embodiment, the process 700 includes establishing 702 a TCP connection with a backend server. The TCP connection may be established using, for instance, a TCP three-way handshake. As with other techniques described above, a backend server is used for the purpose of illustration, but any server or other suitable computing device may be utilized in place of a backend server. After having established 702 a TCP connection with a backend server, the system performing the process 700 may establish 704 a TLS session with the backend server. For example, the system performing the process 700 may perform a TLS handshake process in accordance with a TLS handshake protocol, thereby negotiating a set of session keys with the backend server. Note that other operations take place instead of negotiation of a new session, such as renegotiation of an existing session or resumption of a previously-negotiated session.

At a later point in time, perhaps after communicating with the backend server using the TLS record protocol, the system performing the process 700 may terminate 706 the TCP connection that was established with the backend server. Termination may be made in various ways, such as by terminating to leave a half-open connection (where the backend server can still send information to the system performing the process 700) or by a termination handshake. Note that variations of the process 700 include those where no termination of the TCP connection occurs.

At some point, the system performing the process 700 may perform operations to continue communication over the TLS session that was established. To accomplish this, the system performing the process 700 may determine 708 whether it has a TCP connection established with a frontend server. If determined 708 that the system performing the process 700 has an existing TCP connection with the frontend server, the system may then continue 710 communications with the backend server over the TLS session that was established with the backend server. Techniques noted above, such as session renegotiation, session resumption, and re-association of the TLS session with different TCP connections, may be used to enable resumption of the TLS session.

If the system performing the process 700 determines 708 that it does not have an existing TCP connection with the frontend server, the system may then establish 712 a TCP connection with the frontend server, such as described above. Once the TCP connection with the frontend server has been established 712, the system performing the process 700 may then communicate 710 with the backend server through the frontend server, such as described above. For example, the system performing the process 700 may transmit encrypted records to the frontend server in accordance with a TLS record protocol. The frontend server may be configured to detect records for the backend server and forward them accordingly, using various techniques such as encapsulation, network address translation or other techniques, as applicable in a particular environment in which the process 700 is performed.

As with all processes described herein, variations to the process 700 are considered as being within the scope of the present disclosure. For instance, a system performing the process 700 may have established multiple different TLS sessions with different backend or other servers. The TCP connection that is established with the frontend server by the system performing the process 700 may be used to multiplex multiple TLS sessions over the TCP connection. The frontend server may be configured to selectively forward TLS records to the appropriate destination.

Figure 8:
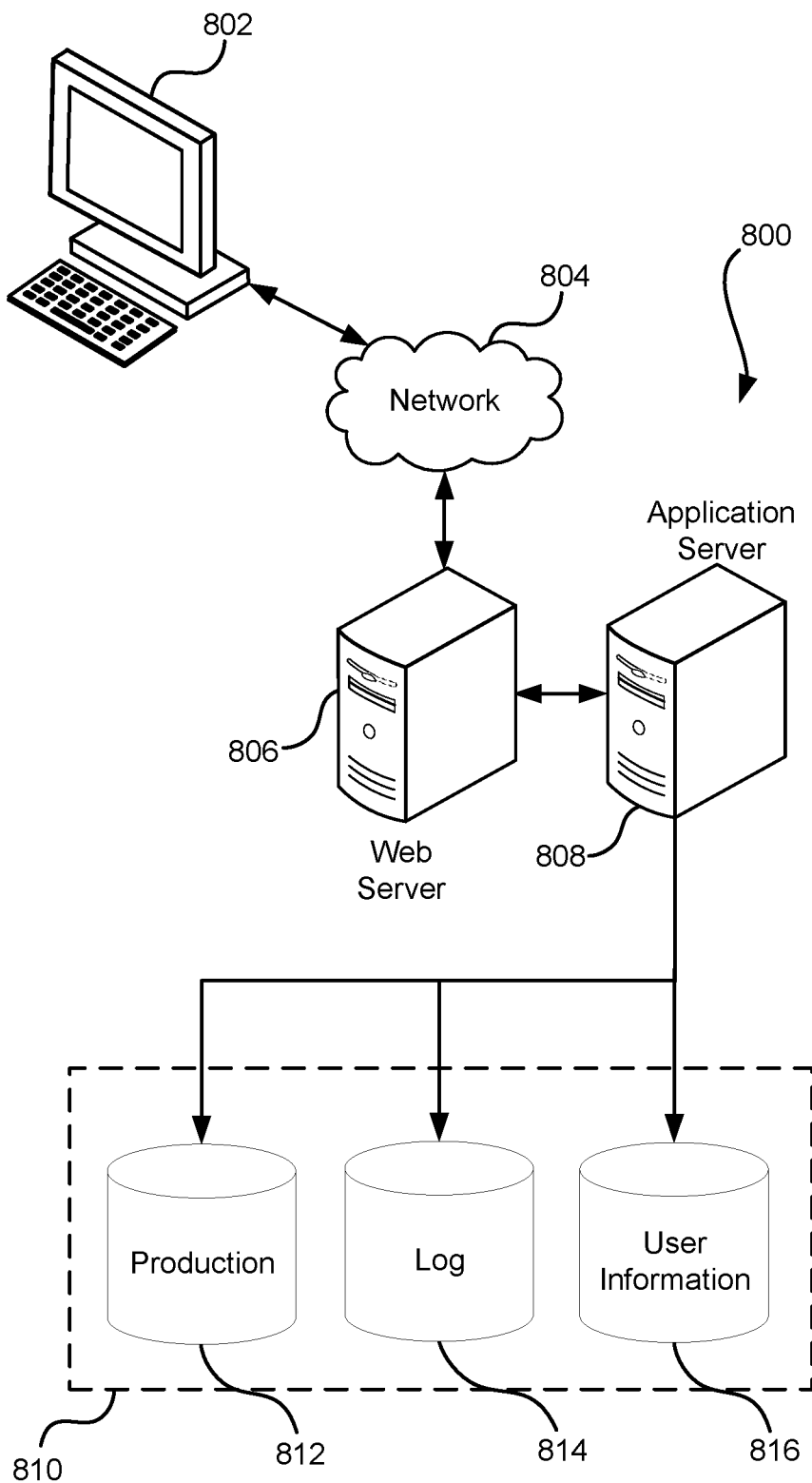
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Embodiments of the disclosure can be described in view of the following clauses:

1. A computer-implemented method, comprising:
   performing, at a frontend server computer system, a handshake process to establish a secure communications channel with a client computer system, the handshake process including:
   providing, to the client computer system:
   a first digital certificate and a second digital certificate, the first digital certificate specifying a first public cryptographic key that corresponds to a first private cryptographic key accessible to the server computer system; and a second digital certificate, the second digital certificate specifying a second public cryptographic key that corresponds to a second private cryptographic key that is accessible to a backend server computer system but inaccessible to the frontend server computer system;

receiving, from the client computer system, an encrypted first secret;

decrypting, using the first private cryptographic key, the encrypted first secret;

receiving, from the client computer system, an encrypted second secret; and forwarding the encrypted second secret to the backend server computer system;

using the first secret to decrypt a first set of records received from the client computer system; and forwarding records of a second set of records received from the client computer system to the backend server computer system.

2. The computer-implemented method of clause 1, wherein using the first secret to decrypt a first set of records comprises deriving, from the first secret, a decryption key.

3. The computer-implemented method of clause 1 or 2, wherein the second set of records is forwarded without decryption by the frontend server.

4. The computer-implemented method of any of clauses 1 to 3, further comprising, for a record received form the client computer system, selecting an operation from a set of operations comprising: decryption using the first secret; and forwarding to the backend server.

5. A system, comprising at least one computing device configured to implement one or more services, the one or more services configured to:

determine a first secret usable to decrypt communications from a first computer system;

provide, to the first computer system, a public cryptographic key corresponding to a private cryptographic key that is inaccessible to the one or more services;

receive an encrypted communication from the first computer system;

select an operation from a set of operations the one or more services are configured to perform, the set of operations comprising: using the first secret to decrypt the communication; and providing the received encrypted communication to a second system; and perform the selected operation.

6. The system of clause 5, wherein the one or more services select the operation based at least in part on information received with the encrypted communication.

7. The system of clause 5 or 6, wherein the one or more services select the operation based at least in part on a message from the first computer system indicating which operation to select.

8. The system of any of clauses 5 to 7, wherein the one or more services are further configured to receive, from the first computer system, a second secret and forward the second secret to the second computer system.

9. The system of any of clauses 5 to 8, further comprising the second system.

10. The system of any of clauses 5 to 9, wherein the system is further configured to:

provide a public cryptographic key corresponding to a private cryptographic key accessible to the one or more services; and determine the first secret at least in part by decrypting, using the private cryptographic key accessible to the one or more services, information received from the first computer system.

11. The system of any of clauses 5 to 10, wherein one or more services are configured to determine the first secret by performing a transport layer security handshake process with the first computer system.

12. The system of any of clauses 5 to 11, wherein, as a result of the selected operation is providing the received encrypted communication to the second system, the one or more services do not decrypt the received encrypted communication.

13. A non-transitory computer-readable storage medium having stored thereon executable instructions that, when executed by one or more processors of a computer system, cause the computer system to at least:

establish a connection with a first computer system;

determine a set of encryption keys that includes a first encryption key and a second encryption key;

selectively encrypt communications for transmission over the established connection such that:

communications for the first computer system are encrypted with the first encryption key, without being encrypted by the second encryption key, to enable the first computer system to decrypt the communications for the first computer system and operate in accordance with the decrypted communications without participation by the second computer system; and communications for a second computer system are encrypted with the second encryption key; and transmit the selectively encrypted communications over the established connection.

14. The non-transitory computer-readable storage medium of clause 13, wherein the instructions further comprise instructions that, when executed by the one or more processors, cause the computer system to include information with the selectively encrypted communications that, for individual communications, indicates to the first computer system whether to decrypt the individual communications or forward the individual communications to the second computer system.

15. The non-transitory computer-readable storage medium of clause 13 or 14, wherein the instructions further comprise instructions that, when executed by the one or more processors, cause the computer system to transmit a message to the first computer system to indicate to the first computer system that one or more future messages are to be forwarded to the second computer system.

16. The non-transitory computer-readable storage medium of any of clauses 13 to 15, wherein the instructions that cause the computer system to determine the set of encryption keys, when executed by the one or more processors, cause the computer system to determine the second encryption key without a virtual connection to the second computer system.

17. The non-transitory computer-readable storage medium of any of clauses 13 to 16, wherein the connection is a transmission control protocol connection.

18. The non-transitory computer-readable storage medium of any of clauses 13 to 17, wherein the selectively encrypted communications are records of a record protocol of a protocol that includes a handshake protocol and a record protocol.

19. The non-transitory computer-readable storage medium of any of clauses 13 to 18, wherein the instructions that cause the computer system to determine the set of encryption keys are part of instructions for performing a handshake process of a handshake protocol.

20. The non-transitory computer-readable storage medium of any of clauses 13 to 19, wherein the instructions that cause the computer system to determine the set of encryption keys, when executed by the one or more processors, cause the computer system to determine multiple encryption keys, including the second encryption key, that are sufficient for encrypting messages that are un-decryptable by the first computer system.

21. The non-transitory computer-readable storage medium of any of clauses 13 to 20, wherein the instructions that cause the computer system to selectively encrypt the communications, when executed by the one or more processors, cause the computer system to:
encrypt a communication for the second computer using the second encryption key, thereby producing an encrypted result; and
encrypt the encrypted result using the first cryptographic key.

22. A system, comprising a set of computing devices configured to implement one or more services, the one or more services configured to:
establish a first transmission control protocol connection between a first computer system and a client computer system;
establish, over the established first transmission control protocol connection, an encrypted communications session between the first computer system and the client computer system;
establish a second transmission control protocol connection between a second computer system and the client computer system;
receive, at the second computer system, a transmission control protocol packet with a message encrypted in accordance with the established encrypted communications session, the second computer system lacking access to a cryptographic key for decrypting the message;
determine, based at least in part on information in the received transmission control protocol packet, to transmit the received transmission control protocol packet to the first computer system;
transmit the received transmission control protocol packet to the first computer system; and
decrypt, by the first computer system, the message.

23. The system of clause 22, wherein:
the encrypted communications session is a first encrypted communications session, the message is a first message, and the information is first information;
the one or more services are further configured to:
establish a second encrypted communications session between a third computer system and the client computer system;
receive, at the second computer system, a transmission control protocol packet with a second message that is encrypted in accordance with the established second encrypted communications session; and
determine, based at least in part on second information in the transmission control protocol packet with the second message, to transmit the received transmission control protocol packet with the second message to the third computer system;
transmit the received transmission control protocol packet with the second message to the third computer system;
decrypt, at the third computer system, the second message.

24. The system of clause 22 or 23, wherein the encrypted communications session is a transport layer security session.

25. The system of any of clauses 22 to 24, wherein:
the first transmission control protocol connection is over a local area network;
the second transmission control protocol connection is over a public communications network.

26. A computer-implemented method, comprising:
under the control of one or more computer systems configured with executable instructions,
establishing a first network session with a client computer system;
multiplexing multiple encrypted communications sessions over the established network session by at least:
receiving, over the first network session, a first encrypted communication originating from the client computer system, the first encrypted communication being in accordance with a record protocol of a first encrypted communications session and the one or more computer systems lacking an ability to fully decrypt the first encrypted communication;
transmitting the received first encrypted communication to a first server computer system that established, over a second network session, the first encrypted communications session with the client computer system;
receiving, over the first network session, a second encrypted communication originating from the client computer system, the second encrypted communication being accordance with a record protocol of a second encrypted communications session the one or more computer systems lacking an ability to fully decrypt the second encrypted communication; and
transmitting the received second encrypted communication to a second server computer system that established, over a third network session, the second encrypted communications session with the client computer system.

27. The computer-implemented method of clause 26, wherein the first network session is a transmission control protocol connection.

28. The computer-implemented method of clause 26 or 27, wherein the first encrypted communications session is a first transport layer security connection and the second encrypted communications session is a second transport layer security connection.

29. The computer-implemented method of any of clauses 26 to 28, wherein the first encrypted communications session and the second encrypted communications session are established without participation by the system.

30. The computer-implemented method of any of clauses 226 to 29, wherein the first network session is established after establishment of the first encrypted communications session.

31. The computer-implemented method of any of clauses 26 to 30, further comprising determining, based at least in part on first information in the first encrypted communication, to transmit the received first encrypted communication to the first server.
32. The computer-implemented method of any of clauses 26 to 31, wherein transmitting the received first encrypted communication to the first server is performed without having decrypted the first encrypted communication.
33. The computer-implemented method of any of clauses 26 to 32, wherein:
the received first encrypted communication is addressed to a publicly addressable network address; and
the first server lacks a publicly addressable network address.
34. A non-transitory computer-readable storage medium having stored thereon executable instructions that, when executed by one or more processors of a computer system, cause the computer system to at least:
establish a first network session with a first server;
perform a handshake process of an encrypted communications protocol to establish an encrypted communications session over the first network session with the first server;
establish a second network session with a second server;
communicate with the first server such that communications to the first server are in accordance with a record protocol of the encrypted communications session and sent over both the established encrypted communications session and the established second network session.
35. The non-transitory computer-readable storage medium of clause 34, wherein the instructions that cause the computer system to establish the second network session, when executed, cause the computer system to establish the second network session after the encrypted communications session is established.
36. The non-transitory computer-readable storage medium of clause 34 or 35, wherein the instructions further comprise instructions that, when executed by the one or more processors, cause the computer system to:
associate the first network session with the encrypted communications session;
re-associate the encrypted communications session from the first network session to the second network session;
as a result of association of the second network session with the encrypted communications session, transmit communications for the encrypted communications session to the second server.
37. The non-transitory computer-readable storage medium of any of clauses 34 to 36, wherein the first network session is a transmission control protocol connection and the communications are records of a record protocol of a protocol used for the established encrypted communications session.
38. The non-transitory computer-readable storage medium of any of clauses 34 to 37, wherein:
the encrypted communications session is a first encrypted communications session; and
the instructions further comprise instructions that, when executed by the one or more computer systems, cause the computer system to:
establish a second encrypted communications session with a third server; and
communicate with the third server over the both the established second encrypted communications session and the established second network session.
39. The non-transitory computer-readable storage medium of clause 38, wherein the second encrypted communications session is established over a third network session different than the second encrypted communications session.
40. The non-transitory computer-readable storage medium of clause 38, wherein the first encrypted communications session and the second encrypted communications session are concurrently active.
41. The non-transitory computer-readable storage medium of any of clauses 34 to 40, wherein the established first network session is terminated before the second network session is established.
42. The non-transitory computer-readable storage medium of any of clauses 34 to 41, wherein the communications are records of a transport layer security protocol. The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising a set of computing devices that implement one or more services to:
   establish a network connection with a client computer system;
   receive, over the network connection, a network packet that includes an encrypted message, the encrypted message being encrypted using a cryptographic key of a communications session established over another network connection between the client computer system and an additional computer system; and
   as a result of an attempt to decrypt at least a portion of the network packet being unsuccessful due to lack of access to the cryptographic key, provide the network packet to the additional computer system.

2. The system of claim 1, wherein the network connection with the client computer system is a transmission control protocol (TCP) connection.

3. The system of claim 1, wherein the communications session with the client computer system is terminated prior to providing the network packet to the additional computer system.

4. The system of claim 1, wherein:
   the network connection is over a public communications network; and
   the network packet is provided over a local area network.

5. A computer-implemented method, comprising:
   establishing a network connection with a client computer system;
   receiving, over the network connection, a network packet that includes an encrypted message, the encrypted message being encrypted using a cryptographic key of a communications session established over another network connection between the client computer system and an additional computer system; and
   as a result of an attempt to decrypt at least a portion of the network packet being unsuccessful due to lack of access to the cryptographic key, providing the network packet to the additional computer system.

6. The computer-implemented method of claim 5, further comprising:
   obtaining, from the additional computer system, a decrypted network packet, the decrypted network packet comprising at least a message encrypted using a second cryptographic key; and
   decrypting, through use of the second cryptographic key, the message.

7. The computer-implemented method of claim 5, wherein the network connection with the client computer system is a TCP connection.

8. The computer-implemented method of claim 5, wherein the network connection with the client computer system is over a local area network.

9. The computer-implemented method of claim 5, wherein providing the network packet to the additional computer system includes:
   establishing a second network connection with the additional computer system; and
   transmitting, over the second network connection, the network packet.

10. The computer-implemented method of claim 5, wherein the network packet is provided to the additional computer system in accordance with a record protocol of an encrypted communications session established over the network connection.

11. The computer-implemented method of claim 5, further comprising establishing a transport layer security session with the client computer system through negotiation of a set of session keys.

12. The computer-implemented method of claim 5, further comprising terminating the network connection with the client computer system in response to receiving the network packet.

13. A non-transitory computer-readable storage medium storing thereon executable instructions that, as a result of being executed by one or more processors of a computer system, cause the computer system to at least:
   establish a network connection with a client computer system;
   receive, over the network connection, a network packet that includes an encrypted message, the encrypted message being encrypted using a cryptographic key of a communications session established over another network connection between the client computer system and an additional computer system; and as a result of an attempt to decrypt at least a portion of the network packet being unsuccessful due to lack of access to the cryptographic key, provide the network packet to the additional computer system.

14. The non-transitory computer-readable storage medium of claim 13, wherein an indication specifies that the additional computer system received the network packet for decryption of the encrypted message from the network packet.

15. The non-transitory computer-readable storage medium of claim 13, wherein the network connection is over a public communications network.

16. The non-transitory computer-readable storage medium of claim 13, wherein the encrypted message is further encrypted using a second cryptographic key accessible by the additional computer system.

17. The non-transitory computer-readable storage medium of claim 13, wherein the network packet is provided to the additional computer system over a local area network.

18. The non-transitory computer-readable storage medium of claim 13, wherein the communications session with the client computer system is established in accordance with a record protocol of the communications session and is encrypted using the cryptographic key.

19. The non-transitory computer-readable storage medium of claim 13, wherein the network connection is a first transport layer security connection and the network packet is provided to the additional computer system over a second transport layer security connection.

20. The non-transitory computer-readable storage medium of claim 13, wherein the executable instructions further cause the computer system to determine, based at least in part on first information in the network connection, to utilize the cryptographic key to generate the encrypted message.

* * * * *